United States Patent [19]

Jacobs

[11] 4,449,348
[45] May 22, 1984

[54] COMPOSITE STATIC STRUCTURE

[76] Inventor: James R. Jacobs, 2210 Murray Hill Rd., (#3), Cleveland, Ohio 44106

[21] Appl. No.: 312,289

[22] Filed: Oct. 16, 1981

[51] Int. Cl.³ .......................................... E04H 12/00
[52] U.S. Cl. .............................. 52/648; 52/DIG. 10; 297/441
[58] Field of Search ................... 52/DIG. 10, 648, 81, 52/223 R; 312/257; 227/8 R, 8 N; 273/155; 297/441, 440

[56] References Cited

U.S. PATENT DOCUMENTS

| | | | |
|---|---|---|---|
| 1,850,534 | 3/1932 | Clausen | 43/88 |
| 3,063,521 | 11/1962 | Fuller | 52/81 |
| 3,296,714 | 1/1967 | Klotz | 46/29 |
| 3,354,591 | 11/1967 | Fuller | 52/648 |
| 3,494,578 | 1/1968 | Curetor | 52/DIG. 10 |
| 3,614,847 | 10/1971 | Debeaux | 52/648 |
| 4,148,520 | 4/1979 | Miller | 52/648 |
| 4,156,997 | 6/1979 | Decker | 52/648 |
| 4,207,715 | 1/1980 | Kitrick | 52/81 |

OTHER PUBLICATIONS

Life Magazine, Dec. 7, 1959, pp. 85 and 86.

Primary Examiner—Henry E. Raduazo
Attorney, Agent, or Firm—Pearne, Gordon, Sessions, McCoy, Granger & Tilberry

[57] ABSTRACT

A composite static structure formed of interdependent subcomponents, referred to as simple tetrahypars, combined to achieve an independent structural component or tetrahypar. Each simple tetrahypar has two rigid struts spaced along and extending perpendicular to a common axis of twist and lying in planes that intersect along the axis. The struts are connected by a torsion member, called a twister, that extends along the axis of twist. One strut of one tetrahypar is connected between one set of ends of the two struts of the other tetrahypar, and the other strut of the one tetrahypar is connected between the other set of ends of the two struts of the other tetrahypar. A structural component (or tetrahypar) of the type thus constructed may be combined in several ways with one or more other tetrahypars to form various tetrahypar structures, such as by joining tetrahypars at the points of connection (or vertices) between struts of the simple tetrahypars, by joining (or combining) along a strut of one tetrahypar coextensive or coinciding with a strut of another tetrahypar, by joining the midpoint of one strut of one tetrahypar with the midpoint of one strut of the other tetrahypar, and the midpoint of another strut of the one tetrahypar with the midpoint of another strut of the other tetrahypar, or by various combinations of the above.

10 Claims, 22 Drawing Figures

COMPOSITE STATIC STRUCTURE

BACKGROUND OF THE INVENTION

This invention relates to static structures suitable for a wide range of specific applications, and especially to static structure components that may be combined with one another in a number of ways to achieve various results. More particularly, the invention relates to a unique structural technique that produces a static structure component called a tetrahypar used in creating composite tetrahypar structures of unique aesthetic and utilitarian qualities.

The invention utilizes structural members that are interconnected in a way that stresses the members in a unique manner. The stresses involved include primarily either torsion and tension, or torsion and compression. The rigidity of the structure depends on the utilization of one or the other of these stress combinations. The outline of the rigid skeletal, three-dimensional form thus constructed defines the four faces of a tetrahedron, the most basic polyhedron. Also, each of the rigid structural members can be considered as a generatrix of a hyperbolic paraboloid.

These rigid skeletal components (tetrahypars) may be assembled together in a variety of ways to produce many types of static structures (tetrahypars), including decorative household furnishings such as hanging plant holders, room dividers, and lighting assemblies, as well as chairs and tables and architectural structures such as tents, greenhouses, and permanent dwellings, to name a few. An additional application is in the field of educational models.

SUMMARY OF THE INVENTION

It is among the objects of the invention to provide a basic static structure component capable of being constructed with a minimum of materials and assembly time and capable of being combined with other similar components.

Another object is to combine such basic static structure components to produce a variety of useful assemblies.

These and other objects are accomplished with the novel static structure (tetrahypars) of the invention, which is comprised of a number of structural elements assembled to produce a skeletal, three-dimensional form. The simplest tetrahypar of the invention includes at least two, interdependent tetrahypar subcomponents comprised of two struts spaced along and extending perpendicular to a common axis. The struts lie in planes that intersect along the axis and a torsion member, called a twister, extending along the axis, connects the struts to one another. The torsion member or twister is stressed in torsion. The struts are also connected to one another at locations spaced from the axis in a manner to resist the torsional force of the torsion member or twister and retain the component in a generally rigid, static condition.

A simple tetrahypar thus described may be combined with another simple tetrahypar in such a way that one strut of a first simple tetrahypar is connected at one end to an end of one strut of a second simple tetrahypar and at the other end to an end of the other strut of the second simple tetrahypar. The other strut of the first simple tetrahypar is connected at one end to the other end of the one strut of the second simple tetrahypar and at the other end to the other end of the other strut of the second simple tetrahypar. Accordingly, the struts of each simple tetrahypar resist the torsional force exerted by the torsion member or twister of the other simple tetrahypar.

DESCRIPTION OF THE PREFERRED EMBODIMENTS

Figure 1:
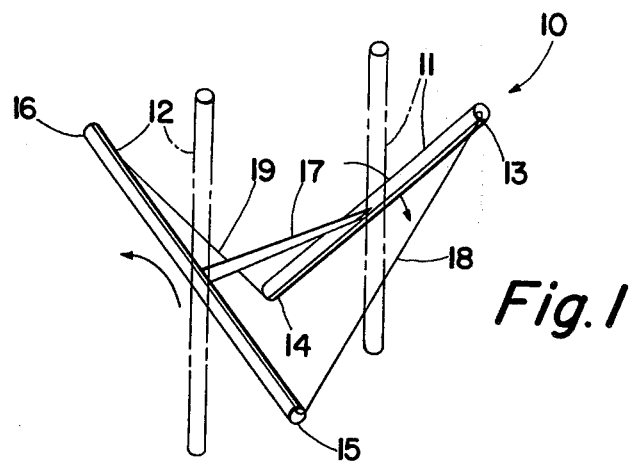
FIG. 1 is a perspective view, illustrating the construction of a basic static structure or simple tetrahypar embodying the invention showing the elements of the assembly in a preliminary condition in solid lines and in a stressed or final position in dashed lines wherein it is retained by tension elements.
Figure 2:
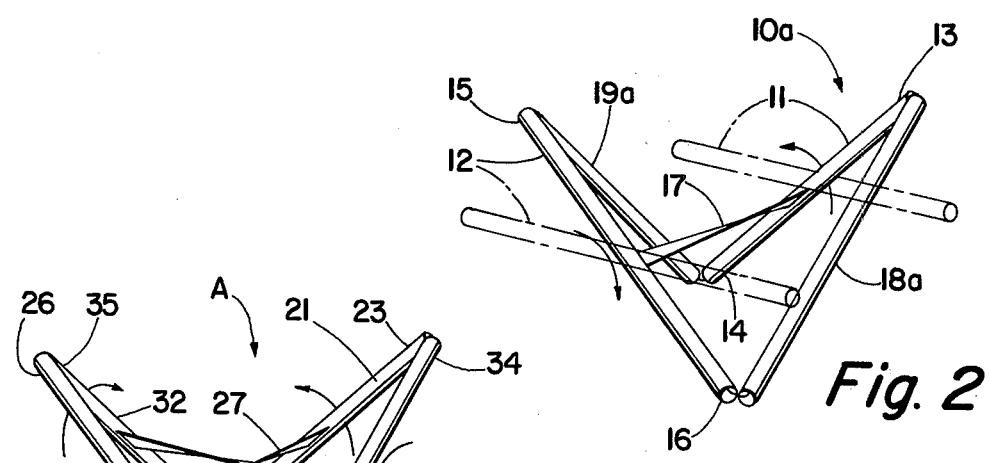
FIG. 2 is a perspective view, similar to FIG. 1, illustrating a basic static structure or simple tetrahypar embodying the invention but showing the assembly retained in a stressed or final position by compression elements.

Referring more particularly to the drawings, and initially to FIGS. 1 and 2, there is shown a static structure component or simple tetrahypar 10 embodying the invention and the manner in which the various elements of the tetrahypar are assembled, stressed relative to one another, and secured to form a rigid structure.

The basic static structure component or simple tetrahypar 10 comprises a pair of struts 11 and 12 that are originally coplanar and parallel, as illustrated in dashed lines in FIGS. 1 and 2. The ends of the strut 11 are identified by the numerals 13 and 14, and the ends of the strut 12 are identified by the numerals 15 and 16. The struts 11 and 12 are connected to one another at approximately their centers by a perpendicular torsion member or "twister" 17.

In the embodiment shown, both the struts 11 and 12 and twister 17 are formed of wood; however, other materials such as fiber glass and metal may of course be used, as appropriate. The principal requirement for the twister 17 is that it be capable of flexure in torsion through a twist rotation of 90 degrees between its ends.

As illustrated in solid lines in FIG. 1, the construction of the simple tetrahypar 10 requires that the struts 11 and 12 be turned 90 degrees relative to one another to a perpendicular orientation or, in other words, so that they lie in perpendicular planes that intersect along the axis of twist defined by the twister 17. This twisting also twists the twister 17, placing it in torsion.

With the struts 11 and 12 and twister 17 in this condition, the ends 13 and 15 of the struts 11 and 12, respectively, are connected together by a tension element 18 and the other ends 14 and 16 of the struts 11 and 12, respectively, are connected by another tension element 19 to resist the torsional force of the twister 17 and retain the struts, and thus the entire assembly, in a static condition. The tension elements 18 and 19 may be any flexible, but generally inextensible, elements such as string, rope, cable, or any number of similar flexible connecting means.

It will also be noted that the same results could be achieved by using compression elements 18a and 19a connected in a reverse manner, as shown in FIG. 2, or, in other words, between the ends 13 and 16 of the struts 11 and 12 on the one hand and the other ends 14 and 15 of the struts 11 and 12, respectively, on the other hand. Compression elements could be other members identical to the struts 11 and 12. Also, members identical to the struts 11 and 12 could be used as tension members as well.

The geometrical relationships between the various elements of the simple tetrahypar 10 may be analyzed as follows. The struts 11 and 12 are defined by opposite, diagonal, parallel faces of an imaginary superimposed cube and the twister 17 represents one of the three axes of the cube through its center between the center of the struts 11 and 12. In this case, the ratio of the length of the twister 17 to the length of the struts is 1:1.414. The tension elements 18 and 19 represent diagonals on another pair of opposed parallel surfaces of the cube, the diagonals extending between the respective ends of the struts 11 and 12.

The struts 11 and 12 and tension members 18 and 19 intersect at four of the eight corners of the imaginary cube and these four corners define a tetrahedron. Thus, the component 10 is essentially a skeletal structure that defines a tetrahedron, the most basic among polyhedrons.

Figure 3:
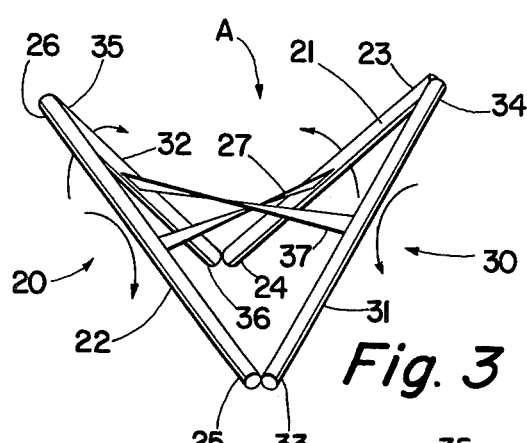
FIG. 3 is a perspective view illustrating two interdependent static structures or simple tetrahypars assembled with one another to form an independent, rigid, static structure or tetrahypar embodying the invention.
Figure 4:
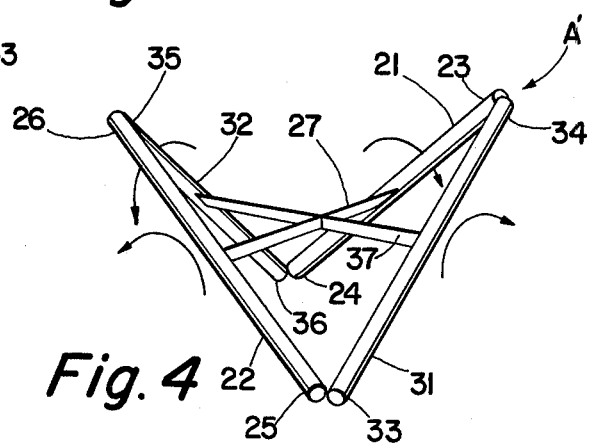
FIG. 4 is a perspective view, similar to FIG. 3, two of the static structures or simple tetrahypars assembled with one another to form an independent, rigid, static structure or tetrahypar that is stressed differently from that of FIG. 3.

FIG. 3 illustrates the combining of two static structure subcomponents with one another to form a rigid, independent, basic static tetrahypar structure A. The tetrahypar A comprises two simple tetrahypars 20 and 30 similar to the subcomponent 10 described above combined in a mutually cooperative manner. The simple tetrahypar 20 includes struts 21 and 22 with ends 23, 24, 25, and 26, respectively, that are fixed in perpendicular orientation relative to one another and connected by a twister 27. The simple tetrahypar 30 comprises struts 31 and 32 with ends 33, 34, 35, and 36, respectively, connected to one another by a twister 37 that extends perpendicular to the twister 27. The ends 23 and 25 of the struts 21 and 22 are connected to one another by the strut 31, and the ends 24 and 26 of the struts 21 and 22 are likewise connected to one another by the struts 32. Thus, the struts all serve as tension members with respect to the other subcomponent to resist the torsional force exerted by the respective twisters 27 and 37. As a result of this interrelationship, the tetrahypar A, which would otherwse be unstable, or, in other words, not rigid, is held in a rigid or static condition due to the unique interrelationshps between the structural elements and the unique use of torsion as the stabilizing force in the structure.

Figure 5:
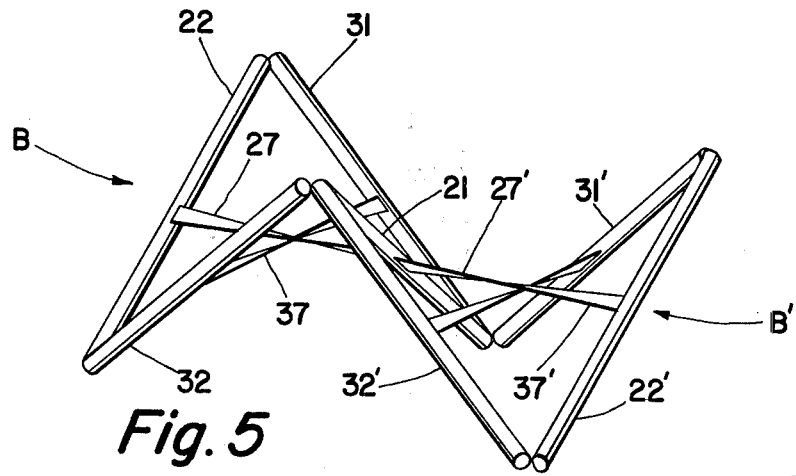
FIG. 5 is a perspective view illustrating two independent, rigid, static structures or tetrahypars of FIG. 3 assembled with one another to achieve a unique composite tetrahypar structure.

FIG. 5 illustrates a pair of tetrahypars B and B' assembled in an alternate way whereby one of the struts, in this case the strut 21 of the tetrahypar B, is coextensive or coincides with the strut 21 of the tetrahypar B'. In other words, the same strut 21 is used as the respective strut of both of the tetrahypars. The composite tetrahypar structure B, B' rests on three vertices of the assembly, and has a variety of uses, such as supporting objects on the supports designed by the intersecting twisters 27 and 37 on the one hand and 27' and 37' on the other hand.

Figure 6:
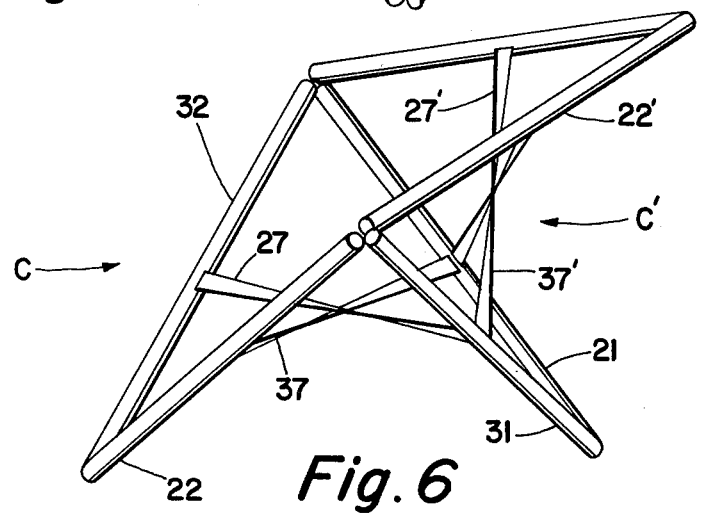
FIG. 6 is a perspective view illustrating another way of combining two tetrahypars of FIG. 3 to achieve in this case another unique composite tetrahypar structure suitable for use as a chair.

FIG. 6 illustrates still another composite tetrahypar structure formed of tetrahypars C and C' wherein the combining is accomplished in such a way that two of the struts 21 and 31 of the tetrahypar C are coextensive with or coincide with two of the struts of the tetrahypar C'. In other words, the same struts 21 and 31 of one tetrahypar are used as corresponding struts 21 and 31 of the other tetrahypar.

Figure 7:
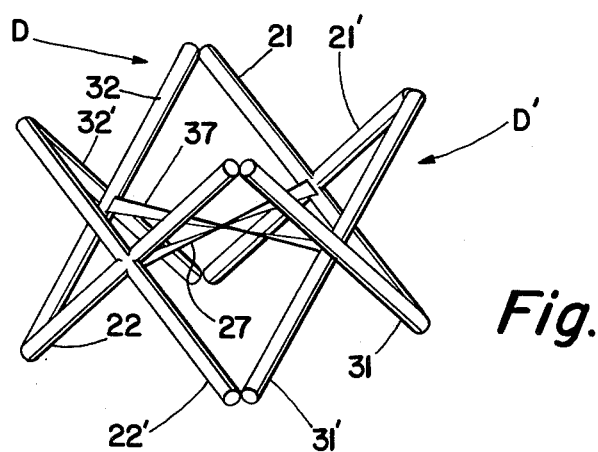
FIG. 7 is a perspective view illustrating still another way of combining tetrahypars to achieve still another unique composite tetrahypar static structure.

FIG. 7 illustrates still another composite tetrahypar structure formed of tetrahypars D and D' wherein the combining is accomplished in such a way that the struts 21 and 22 of the tetrahypar D intersect the struts 21' and 22' of the component D' at the midpoints of the respective struts. Likewise, the struts 31 and 32 of the component D intersect the struts 31' and 32' of the component D' at the respective midpoints of the struts so that the intersections essentially form crosses. In this way, one twister 27 is used for both struts of the cross formed by struts 21 and 21' on the one hand and the cross formed by the struts 22 and 22' on the other hand. In the same way, the twister 37 is used for both the pair of struts 31 and 31' and the other intersecting pair 32 and 32'.

The resulting composite tetrahypar structure can be used, for example, as a support for a coffee table or as a component of other furniture items.

Figure 8:
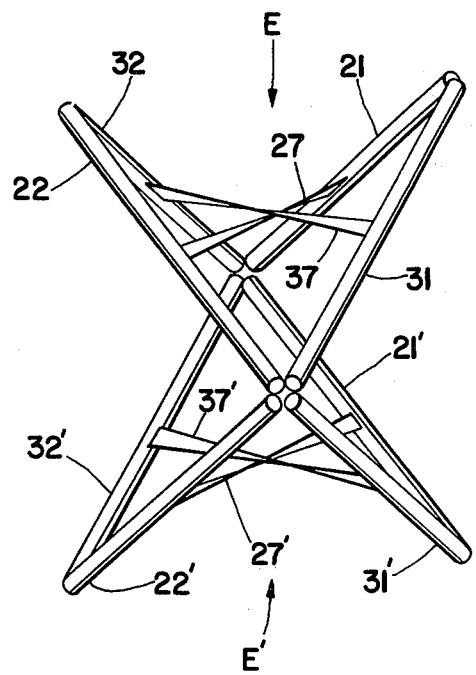
FIG. 8 is a perspective view illustrating the combining of two tetrahypars of FIG. 3 to form a tetrahypar structure suitable for use as a hanging plant holder or "plant ladder"
Figure 9:
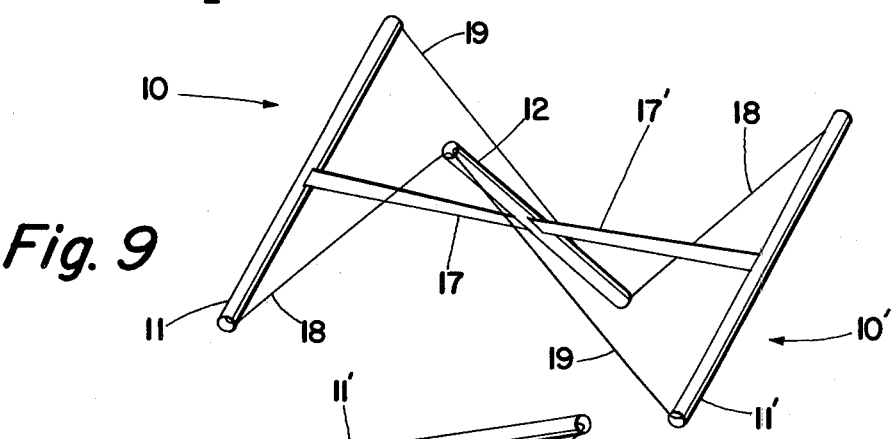
FIGS. 9-22 illustrate several other composite tetrahypar structures formed in various ways from the tetrahypars shown in FIGS. 1 through 4.
Figure 10:
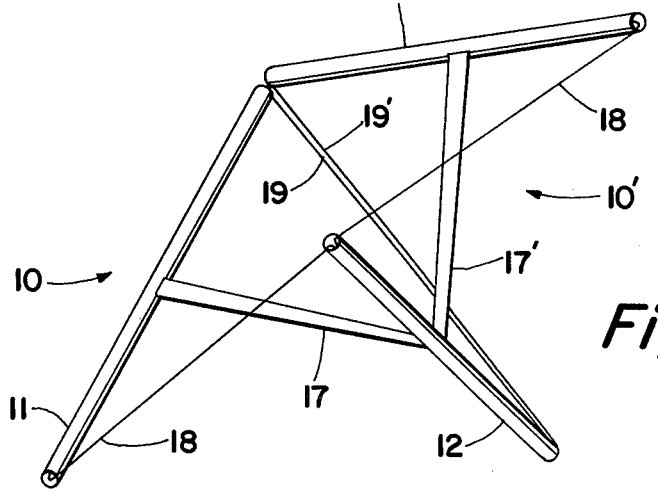
Figure 11:
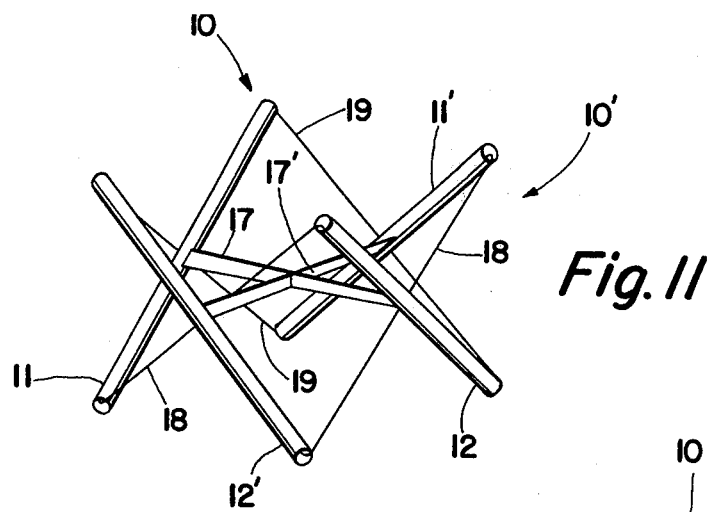
Figure 12:
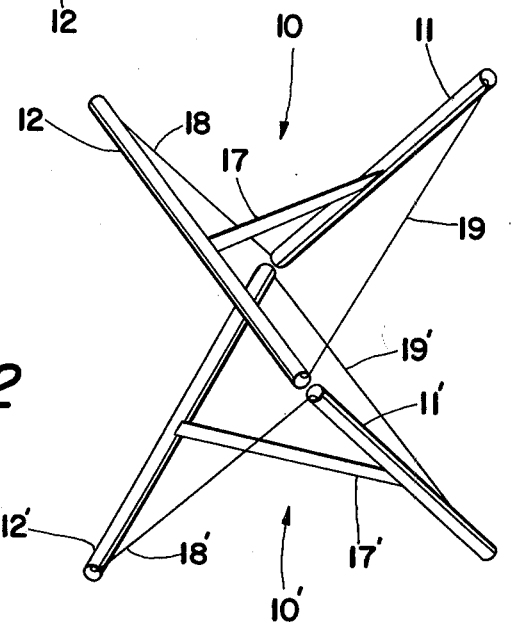

FIG. 8 illustrates two tetrahypars E and E' connected at their vertices to form a composite tetrahypar structure. Several more tetrahypars E and E' may be connected to the composite tetrahypar structure shown at their vertices in a vertical stack to form a composite tetrahypar structure having a wide range of utility, a specific example being for use as a hanging or suspended plant holder or what might be termed a "plant ladder."

FIGS. 9 through 14 show other composite tetrahypar structures that utilize combinations of the simple tetrahypar 10 shown in FIG. 1.

FIGS. 15 through 22 show other composite tetrahypar structures utilizing variations and combinations of the tetrahypars shown in FIGS. 1 through 9.

The tetrahypars of FIGS. 9 through 12 utilize the torsion tension concept described above with respect to FIG. 1. The general manner of combining the basic tetrahypar components parallel that described with respect to the torsion/compression type tetrahypars shown in FIGS. 5 through 8, respectively.

Figure 13:
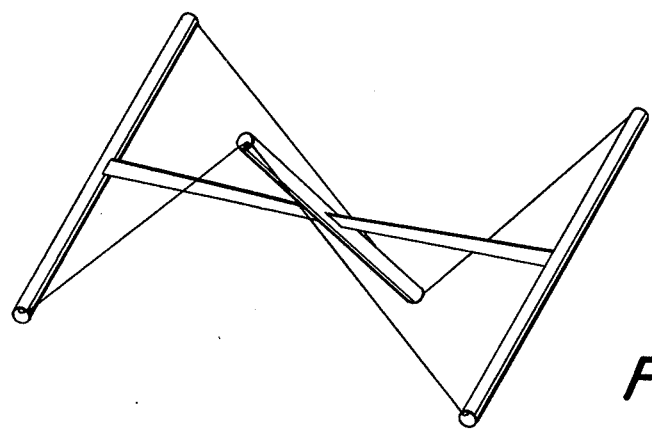
Figure 14:
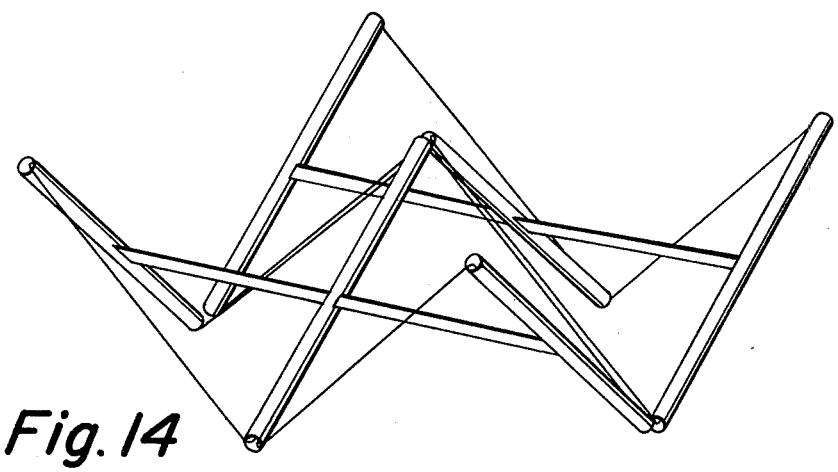
Figure 15:
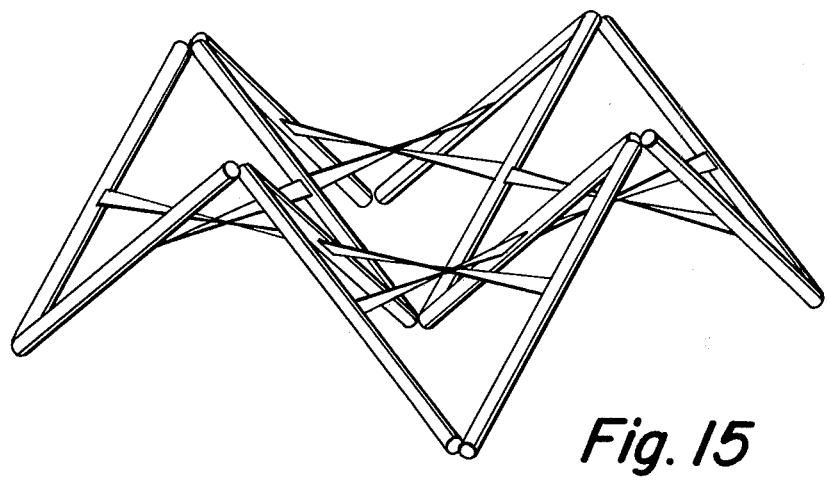
Figure 16:
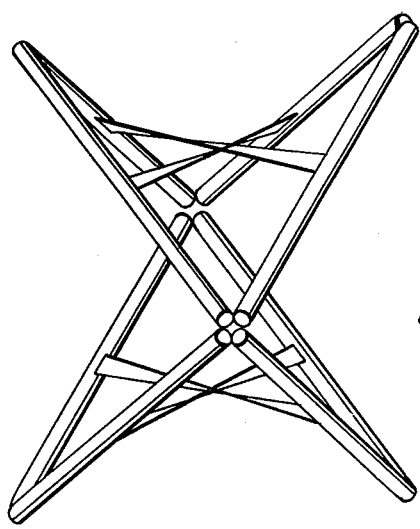
Figure 17:
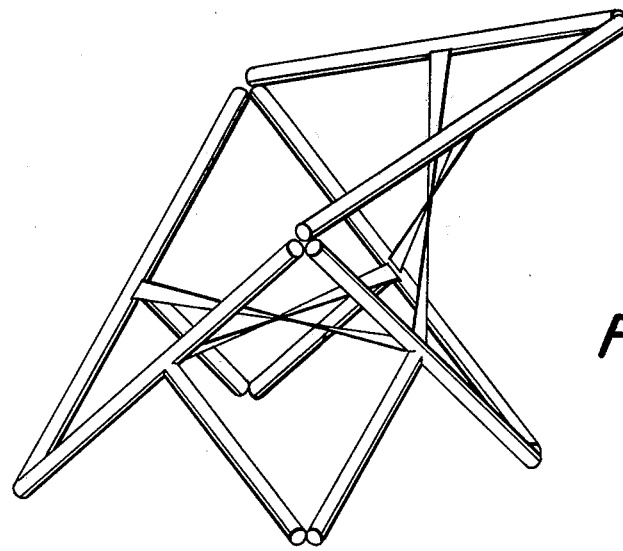
Figure 18:
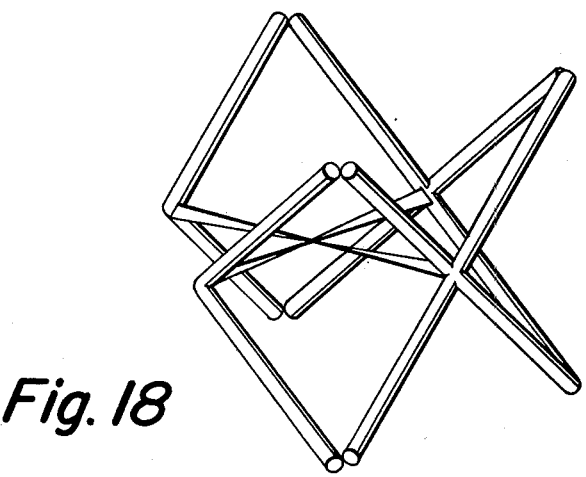
Figure 19:
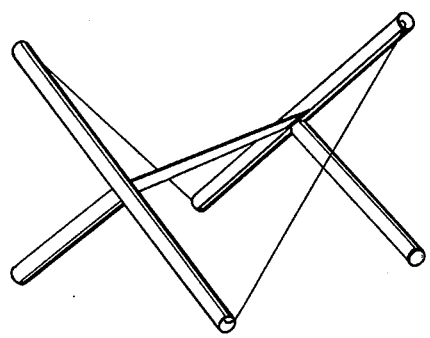
Figure 20:
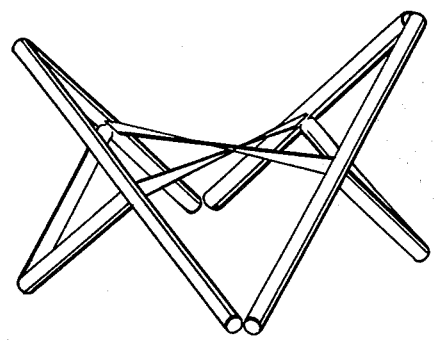
Figure 21:
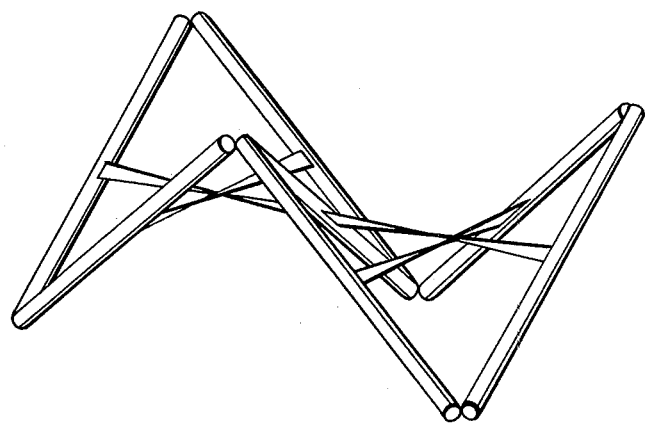
Figure 22:
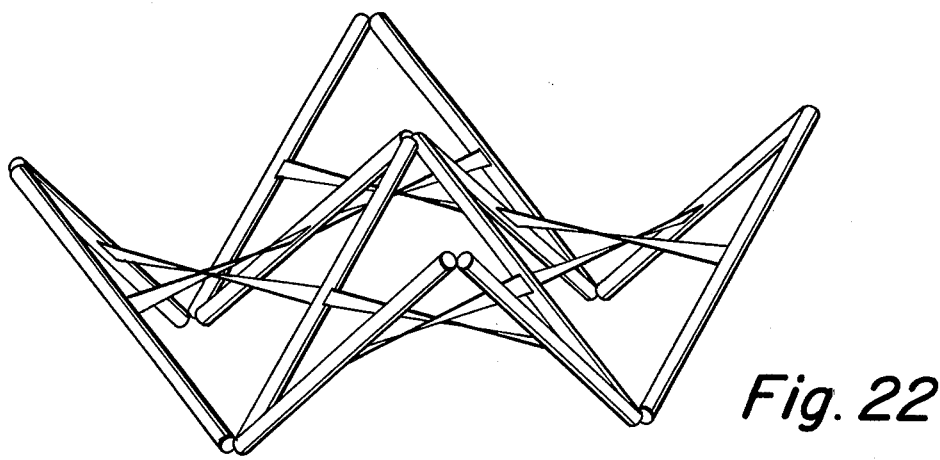

The tetrahypars of FIGS. 15, 21, and 22 could be used as a table support, for example, while those of FIGS. 17, 18, and 20 are suitable for use as frames for chairs. The tetrahypar of FIG. 16 is adaptable for use as a hanging plant holder and those of FIGS. 13, 14, and 21 are suitable for use as tent frame structures.

It will be apparent that the tetrahypars shown are adaptable for a variety of other uses and that they may be constructed in a great range of sizes to suit particular applications.

While the invention has been shown and described with respect to specific embodiments thereof, this is intended for the purpose of illustration rather than limitation, and other variations and modifications of the specific forms herein shown and described will be apparent to those skilled in the art, all within the intended spirit and scope of the invention. Accordingly, the patent is not to be limited in scope and effect to the specific forms herein shown and described, nor in any other way that is inconsistent with the extent to which the progress in the art has been advanced by the invention.

What is claimed is:

1. A static structure component comprising at least two rigid struts spaced along and extending perpendicular to a common axis, and lying in planes that intersect along said axis, a torsion member extending along said axis and connecting said struts, said torsion member being stressed in torsion, and means connecting said struts to one another at locations equally spaced from said axis and approximately at the ends thereof, in a manner to resist the torsional force of said torsion member and to retain said component in a static condition.

2. A static structure component as defined in claim 1, wherein said means connecting said struts to one another at locations spaced from said axis comprises two flexible filamentary elements loaded in tension, one connected between one pair of ends of spaced struts and the other connected between opposite ends of said struts.

3. A static structure component as defined in claim 2, wherein said struts and said flexible filamentary elements define a tetrahedron.

4. A static structure component as defined in claim 1, wherein said means connecting said struts to one another at locations spaced from said axis comprises at least one rigid element loaded in compression.

5. A static structure formed of a least two components, including a first component and second component, each of said components comprising two rigid struts spaced along and extending perpendicular to a common axis and lying in planes that intersect along said axis, a torsion member extending along said axis and connecting said struts, said torsion member being stressed in torsion, one strut of said first component being connected at one end to an end of one strut of said second component and at the other end to an end of the other strut of said second component and the other strut of said first component being connected at one end to the other end of said one strut of said second component and at the other end to the other end of said other strut of said second component whereby the strut of each component resists the torsional force exerted by the torsion member of the other component.

6. A static structure formed of a plurality of components, each of said components comprising two rigid struts spaced along and extending perpendicularly to a common axis and lying in planes that intersect along said axis, a torsion member extending along said axis and connecting said struts, said torsion member being stressed in torsion, and means connecting said struts to one another at locations equally spaced from said axis and approximately at the ends thereof, in a manner to resist the torsional force of said torsion member and to retain said component in a static condition.

7. A static structure as defined in claim 6, comprising at least two of said components, the struts of each component being connected to both struts of the other component at the ends of said struts of said other component.

8. A static structure component comprising at least two rigid struts spaced along and extending perpendicular to a common axis, and lying in planes that intersect along said axis, a torsion member extending along said axis and connecting said struts at approximately the midpoints thereof, said torsion member being stressed in torsion, and means connecting said struts to one another at locations spaced from said axis, in a manner to resist the torsional force of said torsion member and to retain said component in a static condition.

9. A static structure formed of a plurality of components, each of said components comprising two rigid struts spaced along and extending perpendicularly to a common axis and lying in planes that intersect along said axis, a torsion member extending along said axis and connecting said struts at approximately the midpoints thereof, said torsion member being stressed in torsion, and means connecting said struts to one another at locations spaced from said axis, in a manner to resist the torsional force of said torsion member and to retain said component in a static condition.

10. A static structure as defined in claim 9, comprising at least two of said components, the struts of each component being connected to both struts of the other component at the ends of said struts of said other component.

* * * * *